(12) United States Patent
Hara et al.

(10) Patent No.: US 8,598,291 B2
(45) Date of Patent: Dec. 3, 2013

(54) ANTIFOULING COMPOSITION, METHOD FOR ITS PRODUCTION AND ARTICLE TREATED THEREWITH

(75) Inventors: Hiroyuki Hara, Tokyo (JP); Shuichiro Sugimoto, Tokyo (JP); Takao Hirono, Tokyo (JP); Takashige Maekawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 625 days.

(21) Appl. No.: 12/626,739

(22) Filed: Nov. 27, 2009

(65) Prior Publication Data

US 2010/0076168 A1 Mar. 25, 2010

Related U.S. Application Data

(63) Continuation of application No. PCT/JP2008/059381, filed on May 21, 2008.

(30) Foreign Application Priority Data

May 30, 2007 (JP) ................................ 2007-143463

(51) Int. Cl.
 *C08F 18/20* (2006.01)
(52) U.S. Cl.
 USPC ........ 526/245; 526/305; 526/307; 526/307.3; 526/307.4; 526/310; 526/320; 526/332; 526/333
(58) Field of Classification Search
 USPC ...................................................... 526/245
 See application file for complete search history.

(56) References Cited

U.S. PATENT DOCUMENTS

| | | | |
|---|---|---|---|
| 5,028,677 A * | 7/1991 | Janowicz | 526/329.7 |
| 5,872,180 A | 2/1999 | Michels et al. | |
| 6,207,777 B1 * | 3/2001 | Shimada et al. | 526/245 |
| 6,271,283 B1 * | 8/2001 | Shimada et al. | 523/122 |
| 2007/0059537 A1 * | 3/2007 | Hupfield | 428/447 |

FOREIGN PATENT DOCUMENTS

| | | |
|---|---|---|
| EP | 1 088 873 A1 | 4/2001 |
| JP | 2043210 | 2/1990 |
| JP | 5271351 | 10/1993 |
| JP | 5279541 | 10/1993 |
| JP | 6279637 | 10/1994 |
| JP | 2777040 | 5/1998 |
| JP | 11049825 | 2/1999 |
| JP | 3320491 | 6/2002 |
| JP | 2004506073 | 2/2004 |
| JP | 3820694 | 6/2006 |
| WO | WO00/58416 | 10/2000 |
| WO | WO 2005/100421 A1 | 10/2005 |
| WO | WO2005097851 | 10/2005 |
| WO | WO 2007/007743 A1 | 1/2007 |

* cited by examiner

Primary Examiner — Nicole M Buie-Hatcher
(74) Attorney, Agent, or Firm — Oblon, Spivak, McClelland, Maier & Neustadt, L.L.P.

(57) ABSTRACT

Antifouling composition containing a fluorocopolymer which contains from 30 to 70 mass % of polymerized units (a') having a C1-6 perfluoroalkyl group, from 20 to 69 mass % of polymerized units (b') having an alkylene oxide chain and from 1 to 10 mass % of polymerized units (c') having an amino group, and which has anionic groups at its main chain terminals. Method of making.

17 Claims, No Drawings

ANTIFOULING COMPOSITION, METHOD FOR ITS PRODUCTION AND ARTICLE TREATED THEREWITH This application is a continuation of PCT/JP08/59381 filed May 21, 2008.

TECHNICAL FIELD

The present invention relates to an antifouling composition, a method for its production and an article treated with the antifouling composition.

BACKGROUND ART

Heretofore, as treating agents for water/oil repellent treatment or antifouling treatment of clothing, various compositions have been provided depending upon the particular purposes. For work wears such as work clothes, linen such as rental sheets, etc., it has been common to employ a fluorine type SR (soil release) agent which has both water/oil repellency to prevent soiling and SR (soil release) properties whereby any soil attached may readily be removed by cleaning or washing.

For example, there have been proposed a fluorine type antifouling agent containing, as an effective component, a copolymer of a (meth)acrylate containing a polyfluoroalkyl group, a (meth)acrylate containing a polyoxyalkylene chain and a (meth)acrylate containing a blocked isocyanate group (the following Patent Document 1), a fluorine type antifouling agent containing, as an effective component, a copolymer of a (meth)acrylate containing a polyfluoroalkyl group, a (meth)acrylate containing a polyoxyalkylene chain and a (meth)acrylate containing an acetoacetyl group (the following Patent Document 2), etc.

However, these fluorine type antifouling agents contain a relatively large amount of an organic solvent in order to obtain good dispersibility of the fluorocopolymer, whereby a load to the environment is substantial at the time of practical applications.

Under the circumstances, the following Patent Document 3 proposes a fluorocopolymer prepared by copolymerizing a monomer mixture comprising a (meth)acrylate having a $C_{4-12}$ polyfluoroalkyl group, a (meth)acrylate containing a polyoxyalkylene chain and a (meth)acrylate having an amino group having hydrogen atoms substituted by alkyl groups. It is disclosed that this copolymer has aqueous dispersibility, and it is possible to obtain an oil- and water-proof finishing agent made of an aqueous dispersion, by using such a copolymer.

Patent Document 1: Japanese Patent No. 3,320,491
Patent Document 2: Japanese Patent No. 3,820,694
Patent Document 3: Japanese Patent No. 2,777,040

DISCLOSURE OF THE INVENTION

Problem to be Solved by the Invention

However, the finishing agent disclosed in the above Patent Document 3 has a problem that its soil release property (SR property) is poor, although the aqueous dispersibility of the fluorocopolymer is obtainable.

Further, a polyfluoroalkyl group used in a conventional fluorine type SR agent mainly has at least 8 carbon atoms, but in recent years, from the viewpoint of the influence to the environment, it has been recommended to use a short chain perfluoroalkyl group having less than 8 carbon atoms, for a compound having a perfluoroalkyl group.

The present invention has been made under such circumstances and has an object to provide an antifouling composition which is a fluorine type antifouling composition employing a short chain perfluoroalkyl group and which can be made in the form of an aqueous dispersion containing substantially no volatile organic solvent and has a good soil release property (SR property), an article treated with such an antifouling composition, and a method for producing such an antifouling composition.

Means to Solve the Problem

In order to solve the above problem, the antifouling composition of the present invention comprises from 30 to 70 mass % of polymerized units (a') based on the following monomer (a), from 20 to 69 mass % of polymerized units (b') based on the following monomer (b) and from 1 to 10 mass % of polymerized units (c') based on the following monomer (c), and which has anionic groups at its main chain terminals:

Monomer (a): a compound represented by $F(CF_2)_sY$—$OCOCR=CH_2$, wherein s is an integer of from 1 to 6, R is a hydrogen atom, a $C_{1-3}$ alkyl group or a halogen atom, and Y is a $C_{1-10}$ alkylene group, Monomer (b): a compound represented by $CH_2=CR^1$—$COO$—$(R^2O)_q$—$R^3$, wherein $R^1$ is a hydrogen atom or a methyl group, $R^2$ is a $C_{2-4}$ alkylene group, $R^3$ is a hydrogen atom, a $C_{1-8}$ alkyl group, a (meth)acryloyl group or a glycidyl group, q is an integer of from 1 to 140, and when q is from 2 to 140, the plurality of —$(R^2O)$— present in one molecule may be the same or different from one another, Monomer (c): a compound represented by $CH_2=CR^4$-M-Q-$NR^5R^6$ or $CH_2=CR^4$-M-Q-N(O)$R^5R^6$, wherein $R^4$ is a hydrogen atom or a methyl group, M is —COO— or —CONH—, Q is a $C_{2-4}$ alkylene group or a $C_{2-3}$ alkylene group having some or all of hydrogen atoms substituted by hydroxy groups, each of $R^5$ and $R^6$ which are independent of each other, is a benzyl group, a $C_{1-8}$ alkyl group or a $C_{2-3}$ alkyl group having some or all of hydrogen atoms substituted by hydroxy groups, or $R^5$, $R^6$ and the nitrogen atom may form a piperidino group or a pyrrolidinyl group, or $R^5$, $R^6$, the oxygen atom and the nitrogen atom may form a morpholino group.

Further, the present invention provides an article treated with the antifouling composition of the present invention.

Further, the method for producing the antifouling composition of the present invention comprises a step of polymerizing a monomer mixture comprising from 30 to 70 mass % of the above monomer (a), from 20 to 69 mass % of the above monomer (b) and from 1 to 10 mass % of the above monomer (c), in the presence of a polymerization initiator having an anionic group and/or a chain transfer agent having an anionic group.

Effect of the Invention

According to the present invention, it is possible to obtain an antifouling composition which comprises, as an effective component, a fluorocopolymer having a $C_{1-6}$ perfluoroalkyl group and which can be made in the form of an aqueous dispersion containing substantially no volatile organic solvent and has a good soil release property (SR property), and an article treated with such an antifouling composition.

Further, according to the method for producing an antifouling composition of the present invention, it is possible to obtain an antifouling composition which comprises, as an effective component, a fluorocopolymer having a $C_{1-6}$ perfluoroalkyl alkyl group and which can be made in the form of an aqueous dispersion containing substantially no volatile organic solvent and has a good soil release property (SR property).

BEST MODE FOR CARRYING OUT THE INVENTION

The fluorocopolymer contained in the antifouling composition of the present invention comprises at least polymerized units (a') based on the monomer (a), polymerized units (b') based on the monomer (b) and polymerized units (c') based on the monomer (c). Further, it may contain polymerized units (d') based on the monomer (d).

<Monomer (a)>

The polymerized units (a') are polymerized units formed by cleavage of an ethylenic double bond in the monomer (a).

The monomer (a) is a compound represented by $F(CF_2)_s$—Y—OCOCR=$CH_2$. In the formula, s is an integer of from 1 to 6, R is a hydrogen atom, a $C_{1-3}$ alkyl group or a halogen atom, and Y is a $C_{1-10}$ alkylene group.

The perfluoroalkyl group represented by $F(CF_2)_s$— is preferably $F(CF_2)_2$—, $F(CF_2)_3$—, $F(CF_2)_4$—, $F(CF_2)_5$— or $F(CF_2)_6$—. Among them, $F(CF_2)_4$— or $F(CF_2)_6$— is more preferred.

The alkylene group as Y is preferably —$CH_2$—, —$CH_2CH_2$—, —$(CH_2)_{11}$— or —$CH_2CH_2CH(CH_3)$—, more preferably —$CH_2CH_2$—.

The halogen atom as R is preferably a fluorine atom or a chlorine atom. R is more preferably a hydrogen atom, a methyl group or a chlorine atom.

The monomer (a) is preferably 3,3,4,4,5,5,6,6,7,7,8,8,8-tridecafluorooctyl (meth)acrylate ($C_6F_{13}C_2H_4OCOCH$=$CH_2$ or $C_6F_{13}C_2H_4OCOC(CH_3)$=$CH_2$), 3,3,4,4,5,5,6,6,6-nonafluorohexyl (meth)acrylate ($C_4F_9C_2H_4OCOCH$=$CH_2$ or $C_4F_9C_2H_4OCOC(CH_3)$=$CH_2$), or 3,3,4,4,5,5,6,6,7,7,8,8,8-tridecafluorooctyl α-chloroacrylate ($C_6F_{13}C_2H_4OCOC(Cl)$=$CH_2$).

As the monomer (a), one type may be used alone or two or more types may be used in combination.

<Monomer (b)

The polymerized units (b') are polymerized units formed by cleavage of an ethylenic double bond in the monomer (b).

The monomer (b) is a compound represented by $CH_2$=$CR^1$—$COO(R^2O)_q$—$R^3$. In the formula, $R^1$ is a hydrogen atom or a methyl group, $R^2$ is a $C_{2-4}$ alkylene group, $R^3$ is a hydrogen atom, a $C_{1-8}$ alkyl group, a (meth)acryloyl group or a glycidyl group, and q is an integer of from 1 to 140. When q is from 2 to 140, a plurality of —($R^2O$)— present in one molecule may be the same or different from one another. $R^1$ is preferably a methyl group. q is preferably an integer of from 4 to 137.

In the alkylene oxide chain represented by —($R^2O$)$_q$—, in a case where at least two types of repeating units (—($R^2O$)—) different in the number of carbon atoms in the alkylene group ($R^2$) are contained, the arrangement of the repeating units may be block or random.

As the monomer (b), one type may be used alone, or two or more types may be used in combination. As the monomer (b), it is preferred to use at least two monomers (b) different in $R^2$ in combination. It is particularly preferred to use the monomer (b) having —$C_2H_4O$— and the monomer (b) having —$C_3H_6O$—, as —($R^2O$)—, in combination.

Otherwise, at least two monomers (b) different in both $R^2$ and $R^3$, or at least two monomers (b) different in $R^3$, may be used in combination.

In a case where three or more monomers (b) are used, one of them is preferably one wherein $R^3$ is a (meth)acryloyl group or a glycidyl group, from the viewpoint of the adhesive property and durability.

The monomer (b) is preferably polyethylene oxide mono(meth)acrylate, polypropylene oxide mono(meth)acrylate, methoxypolyethylene oxide mono(meth)acrylate, methoxypropylene oxide mono(meth)acrylate, ethoxypolyethylene oxide mono(meth)acrylate, poly(ethylene oxide-propylene oxide) mono(meth)acrylate, poly(ethylene oxide-tetramethylene oxide) mono(meth)acrylate, poly(propylene oxide-tetramethylene oxide) mono(meth)acrylate, propylene oxide-polybutylene oxide mono(meth)acrylate, octoxypoly(ethylene oxide-propylene oxide) mono(meth)acrylate, polyethylene oxide di(meth)acrylate, polypropylene oxide di(meth)acrylate, polytetramethylene oxide di(meth)acrylate, poly(ethylene oxide-tetraethylene oxide) di(meth)acrylate, poly(propylene oxide-tetraethylene oxide) di(meth)acrylate, poly(ethylene oxide-propylene oxide-ethylene oxide) di(meth)acrylate, or poly(ethylene oxide-propylene oxide)glycidyl ether (meth)acrylate.

In a case where at least two monomers (b) are used in combination, more preferred is a combination of methoxypolyethylene oxide monomethacrylate and polypropylene oxide monomethacrylate, or a combination of methoxypolyethylene oxide monomethacrylate and octoxypoly(ethylene oxide-propylene oxide) monomethacrylate.

In a case where at least three monomers (b) are used in combination, it is preferred to use, in addition to the above two types, polyethylene oxide dimethacrylate or poly(ethylene oxide-propylene oxide-ethylene oxide) dimethacrylate, or poly(ethylene oxide-propylene oxide)glycidyl ether methacrylate, in combination.

<Monomer (c)>

The polymerized units (c') are polymerized units formed by cleavage of an ethylenic double bond in the monomer (c).

The monomer (c) is a compound represented by $CH_2$=$CR^4$-M-Q-$NR^5R^6$ or $CH_2$=$CR^4$-M-Q-N(O)$R^5R^6$.

In the formulae, $R^4$ is a hydrogen atom or a methyl group, M is —COO— or —CONH—, Q is a $C_{2-4}$ alkylene group or a $C_{2-3}$ alkylene group having some or all of hydrogen atoms substituted by hydroxy groups, and each of $R^5$ and $R^6$ which are independent of each other, is a benzyl group, a $C_{1-8}$ alkyl group or a $C_{2-3}$ alkyl group having some of hydrogen atoms substituted by hydroxy groups. $R^5$, $R^6$ and the nitrogen atom may form a piperidino group or a pyrrolidinyl group, or $R^5$, $R^6$, the oxygen atom and the nitrogen atom may form a morpholino group.

Q is preferably a $C_{2-3}$ alkylene group, and each of $R^5$ and $R^6$ is preferably a $C_{1-2}$ alkyl group. M is preferably —COO— (ester bond).

The monomer (c) is preferably N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-diisopropylaminoethyl (meth)acrylate, N,N-dimethylaminopropyl (meth)acrylamide, N-(meth)acryloylmorpholine, N-(meth)acryloylpiperidine, N,N-dimethylaminooxideethyl (meth)acrylate, or N,N-diethylaminooxideethyl (meth)acrylate. Among them, N,N-dimethylaminoethyl methacrylate, N,N-dimethylaminopropyl methacrylamide or N,N-diethylaminoethyl methacrylate is more preferred.

As the monomer (c), one type may be used alone, or two or more types may be used in combination.

<Monomer (d)>

The polymerized units (d') are polymerized units formed by cleavage of a double bond in a polymerizable unsaturated group in the monomer (d).

The monomer (d) is a monomer which is copolymerizable with the monomers (a), (b) and (c) and which has at least one crosslinkable functional group selected from the group consisting of an isocyanate group, a blocked isocyanate group, a urethane bond, an alkoxysilyl group, an epoxy group, an N-methylol group and an N-alkoxymethyl group and has no polyfluoroalkyl group. One which belongs to the monomer (b), does not belong to the monomer (d).

The monomer (d) is preferably a derivative of a (meth)acrylate or a derivative of a vinyl compound.

As the monomer (d), the following compounds may preferably be mentioned.

(1) Compound having an isocyanate group: 2-isocyanateethyl (meth)acrylate, 3-isocyanatepropyl (meth)acrylate, or 4-isocyanatebutyl (meth)acrylate.

(2) Compound having a blocked isocyanate group: A 2-butanoneoxime adduct of 2-isocyanateethyl (meth)acrylate, a pyrazole adduct of 2-isocyanateethyl (meth)acrylate, a 3,5-dimethylpyrazole adduct of 2-isocyanateethyl (meth)acrylate, a 3-methylpyrazole adduct of 2-isocyanateethyl (meth)acrylate, an ε-caprolactam adduct of 2-isocyanateethyl (meth)acrylate, a 2-butanoneoxime adduct of 3-isocyanatepropyl (meth)acrylate, a pyrazole adduct of 3-isocyanatepropyl (meth)acrylate, a 3,5-dimethylpyrazole adduct of 3-isocyanatepropyl (meth)acrylate, a 3-methylpyrazole adduct of 3-isocyanatepropyl (meth)acrylate, an ε-caprolactam adduct of 3-isocyanatepropyl (meth)acrylate, a 2-butanoneoxime adduct of 4-isocyanatebutyl (meth)acrylate, a pyrazole adduct of 4-isocyanatebutyl (meth)acrylate, a 3,5-dimethylpyrazole adduct of 4-isocyanatebutyl (meth)acrylate, a 3-methylpyrazole adduct of 4-isocyanatebutyl (meth)acrylate, or an ε-caprolactam adduct of 4-isocyanatebutyl (meth)acrylate.

(3) Compound having a urethane bond: Triallyl isocyanurate, a tolylene diisocyanate adduct of 3-phenoxy-2-hydroxypropyl acrylate, a hexamethylene diisocyanate adduct of 3-phenoxy-2-hydroxypropyl acrylate, or a hexamethylene diisocyanate adduct of pentaerythritol triacrylate.

(4) Compound having an alkoxysilyl group: A compound represented by $CH_2=CR^8\text{-D-E-SiR}^aR^bR^c$ (wherein D is —OCO—, —COO— or a single bond, E is a $C_{1-4}$ alkylene group, each of $R^a$, $R^b$ and $R^c$ which are independent of one another, is a $C_{1-6}$ alkyl group or a $C_{1-6}$ alkoxy group, and $R^8$ is a hydrogen atom or a methyl group).

Specific examples include 3-methacryloyloxypropyl trimethoxysilane, 3-methacryloyloxypropyl dimethoxymethylsilane, 3-methacryloyloxypropyl triethoxysilane, 3-methacryloyloxypropyl ethoxyethylsilane, vinyl trimethoxysilane, etc.

(5) Compound having an epoxy group: Glycidyl (meth)acrylate.

(6) Compound having an N-methylol group or an N-alkoxymethyl group: N-methylol (meth)acrylamide, N-methoxymethyl (meth)acrylamide, N-ethoxymethyl (meth)acrylamide or N-butoxymethyl (meth)acrylamide.

Among them, the polymer (d) is preferably the above (2) i.e. a compound having a blocked isocyanate group, particularly preferably a 3,5-dimethylpyrazole adduct of 2-isocyanateethyl methacrylate.

As the monomer (d), one type may be used alone, or two or more types may be used in combination.

<Other Monomers>

In the present invention, the fluorocopolymer may further contain polymerized units based on monomers (which may be referred to as other monomers) which are copolymerizable with the monomers (a), (b) and (c) and which do not belong to any of the monomers (a) to (d), in order to improve the physical properties such as the adhesion or adhesive property of the fluorocopolymer to the substrate, durability against friction, etc.

Examples of such other monomers include ethylene, vinylidene chloride, vinyl chloride, vinylidene fluoride, vinyl acetate, vinyl propionate, vinyl isobutanoate, vinyl isodecanoate, vinyl stearate, cetyl vinyl ether, dodecyl vinyl ether, isobutyl vinyl ether, ethyl vinyl ether, 2-chloroethyl vinyl ether, styrene, α-methylstyrene, p-methylstyrene, (meth)acrylamide, N,N-dimethyl (meth)acrylamide, diacetone (meth)acrylamide, methylol-modified diacetone (meth)acrylamide, vinyl alkyl ketone, butadiene, isoprene, chloroprene, benzyl (meth)acrylate, a (meth)acrylate having a polysiloxane, allyl acetate, N-vinylcarbazole, maleimide, N-methylmaleimide, (meth)acrylic acid, 2-hydroxyethyl (meth)acrylate, 2-ethylhexyl (meth)acrylate, glycerol mono(meth)acrylate, hydroxypropyl (meth)acrylate, an adduct of 2-hydroxyethyl methacrylate and ε-caprolacton, propylene oxide diglycidyl ether di(meth)acrylate, tripropylene oxide diglycidyl ether di(meth)acrylate, glycerol diglycidyl ether di(meth)acrylate, etc.

Among them, preferred from the viewpoint of efficiency in improvement of the film forming property or durability of the antifouling composition, is vinylidene chloride, vinyl chloride, vinyl acetate, vinyl propionate, an adduct of 2-hydroxyethyl methacrylate and ε-caprolacton, or glycerol diglycidyl ether di(meth)acrylate.

<Anionic Groups>

The fluorocopolymer in the present invention has anionic groups at its main chain terminals. In the present invention, the main chain of the fluorocopolymer means an atomic chain formed by cleavage of a double bond in a polymerizable unsaturated group or an ethylenic double bond in a monomer. The main chain is preferably a carbon atom chain (which may contain an etheric bond oxygen atom).

In the present invention, the fluorocopolymer may have anionic groups at least at some of its main chain terminals. In order to obtain the effects of the present invention sufficiently, the amount of anionic groups present in the fluorocopolymer is preferably at least 0.1 mass %, more preferably at least 0.3 mass %, per 100 mass % of the fluorocopolymer. Further, from the viewpoint of the ionic balance with the monomer (c), the amount of such anionic groups is preferably at most 3.0 mass %, more preferably at most 2.0 mass %.

In the present invention, the anionic groups are groups capable of being ionized in water to form anions, and specifically, they are preferably at least one type of acid groups selected from the group consisting of carboxy groups, sulfonic acid groups, phosphoric acid groups, chronic acid groups, nitric acid groups and manganic acid groups. Carboxy groups are particularly preferred. These acid groups may be in the form of their salts or esters. Two or more types of anionic groups may be present in one molecule of the fluorocopolymer.

A method for introducing anionic groups to the main chain terminals of the fluorocopolymer is not particularly limited. A convenient method may be a method of using a polymerization initiator having an anionic group and/or a chain transfer agent having an anionic group, at the time of copolymerizing monomers. The anionic group contained in such a polymerization initiator and/or a chain transfer agent is preferably a carboxy group (which may be in the form of a salt or an ester) which is weakly acidic, from the viewpoint of the acidity.

The polymerization initiator having an anionic group is preferably an azo compound having a carboxy group such as 4,4'-azobis(4-cyanovaleric acid), disuccinic acid peroxide or a persulfate. Among them, an azo compound having a carboxy group is more preferred, and 4,4'-azobis(4-cyanovaleric acid) is particularly preferred. The chain transfer agent having an anionic group is preferably 3,3'-dithio-dipropionic acid, thiomalic acid, 2-mercaptopropionic acid, 3-mercaptopropionic acid, thioglycolic acid or the like. Among them, 3-mercaptopropionic acid having a carboxy group is more preferred.

<Fluorocopolymer>

(1) In a case where the fluorocopolymer has polymerized units (a'), (b') and (c') and does not have polymerized units (d'), based on 100 mass % of the entire fluorocopolymer, the polymerized units (a') are from 30 to 70 mass %, preferably from 40 to 65 mass %, the polymerized units (b') are from 20 to 69 mass %, preferably from 30 to 40 mass %, and the polymerized units (c') are from 1 to 10 mass %, preferably from 2 to 6 mass %. In a case where other monomers are also used, the proportion of polymerized units based on such other monomers is preferably at most 20 mass %, more preferably at most 10 mass %.

Within the above range, in an article treated with the antifouling composition of the present invention, good water/oil repellency, good antifouling property and good durability against washing can be accomplished in good balance at the same time.

In the present invention, the proportions of the respective polymerized units are values obtainable from the charged amounts of the respective monomers, on the assumption that the mass of polymerized units derived from the polymerization initiator and chain transfer agent in the fluorocopolymer is 0 (zero).

Further, in a case where the fluorocopolymer is produced by using a polymerization initiator having an anionic group and/or a chain transfer agent having an anionic group, the amount of the polymerization initiator having an anionic group is preferably within a range of from 0.5 to 1.8 parts by mass per 100 parts by mass of the total amount of the monomers to be used for the polymerization reaction, and the amount of the chain transfer agent having an anionic group is preferably within a range of from 0 to 1.5 parts by mass per 100 parts by mass of the total amount of the monomers to be used for the polymerization reaction.

(2) In a case where the fluorocopolymer has polymerized units (a'), (b'), (c') and (d'), based on 100 mass % of the entire fluorocopolymer, the polymerized units (a') are from 30 to 70 mass %, preferably from 40 to 65 mass %, the polymerized units (b') are from 20 to 68 mass %, preferably from 30 to 40 mass %, the polymerized units (c') are from 2 to 10 mass %, preferably from 2 to 6 mass %, and the polymerized units (d') are from 1 to 5 mass %, preferably from 1 to 4 mass %. In a case where other monomers are also used, the proportion of the polymerized units based on such other monomers is preferably at most 20 mass %, more preferably at most 10 mass %.

By incorporating the polymerized units (d') to the fluorocopolymer, in an article treated with the antifouling composition of the present invention, the effects can easily be maintained, and the durability will be improved. Further, the water/oil repellency and antifouling property will be better.

Further in a case where the fluorocopolymer is produced by using a polymerization initiator having an anionic group and/ or a chain transfer agent having an anionic group, the amount of the polymerization initiator having an anionic group is preferably within a range of from 0.5 to 1.8 parts by mass per 100 parts by mass of the total amount of the monomers to be used for the polymerization reaction, and the amount of the chain transfer agent having an anionic group is preferably within a range of from 0 to 1.5 parts by mass per 100 parts by mass of the total amount of the monomers to be used for the polymerization reaction.

A preferred combination of the monomers (a), (b) and (c), the polymerization initiator and the chain transfer agent to be used for the copolymerization, is preferably such that:

The monomer (a) is at least one member selected from 3,3,4,4,5,5,6,6,7,7,8,8,8-tridecafluorooctyl (meth)acrylate, 3,3,4,4,5,5,6,6,6-nonafluorohexyl (meth)acrylate and 3,3,4,4,5,5,6,6,7,7,8,8,8-tridecafluorooctyl α-chloroacrylate, the monomer (b) is a combination of methoxypolyethylene oxide monomethacrylate and polypropylene oxide monomethacrylate, or a combination of methoxypolyethylene oxide monomethacrylate and octoxypoly(ethylene oxide-propylene oxide) monomethacrylate, or a combination having at least one member selected from polyethylene oxide dimethacrylate, poly(ethylene oxide-propylene oxide-ethylene oxide) dimethacrylate and poly(ethylene oxide-propylene oxide)glycidyl ether methacrylate further added to the above combination of monomers (b), the monomer (c) is at least one member selected from N,N-dimethylaminoethyl methacrylate, N,N-dimethylaminopropyl methacrylamide and N,N-diethylaminoethyl methacrylate, and the polymerization initiator is 4,4'-azobis(4-cyanovaleric acid) and the chain transfer agent is 3-mercaptopropionic acid.

The mass average molecular weight (Mw) of the fluorocopolymer is preferably from 5,000 to 100,000, more preferably from 10,000 to 50,000. When the mass average molecular weight is at least the lower limit value in the above range, the durability and oil repellency will be excellent, and when it is at most the upper limit value, the film forming property and liquid stability will be excellent.

In this specification, the mass average molecular weight of the fluorocopolymer is a molecular weight as calculated as polystyrene obtained by measurement by gel permeation chromatography by using a calibration curve prepared by using a standard polystyrene sample.

<Method for Producing Fluorocopolymer>

The fluorocopolymer in the present invention can be obtained by carrying out a polymerization reaction of monomers in a polymerization solvent by using a known method. That is, the fluorocopolymer is obtained via a step of introducing a polymerization solvent and a monomer mixture comprising at least monomers (a), (b) and (c) into a reactor and further adding a polymerization initiator, a chain transfer agent, etc. as the case requires, followed by a copolymerization reaction. By carrying out such a copolymerization reaction in the presence of a polymerization initiator having an anionic group and/or a chain transfer agent having an anionic group, it is possible to obtain a fluorocopolymer having anionic groups at its main chain terminals.

The polymerization solvent is not particularly limited, and it may, for example, be a ketone such as acetone, methyl ethyl ketone or methyl isobutyl ketone; an alcohol such as methanol or 2-propyl alcohol, an ester such as ethyl acetate or butyl acetate; an ether such as diisopropyl ether, tetrahydrofuran or dioxane; a glycol ether or its derivative, such as an ethyl ether or methyl ether of ethylene glycol, propylene glycol or dipropylene glycol; an aliphatic hydrocarbon; an aromatic hydrocarbon; a halogenated hydrocarbon such as perchloroethylene, trichloro-1,1,1-ethane, trichlorotrifluoroethane or dichloropentafluoropropane; dimethylformamide; N-methyl-2-pyrrolidone; butyroacetone; or dimethylsulfoxide (DMSO).

In the polymerization reaction to obtain the fluorocopolymer, the total concentration of monomers in all charged raw materials (including the polymerization solvent) is preferably within a range of from 5 to 60 mass %, more preferably within a range of from 10 to 40 mass %.

In the polymerization reaction to obtain the fluorocopolymer, it is preferred to employ a polymerization initiator. As the polymerization initiator, the above-mentioned polymerization initiator having an anionic group may be used, or a polymerization initiator having no anionic group may be used, or both of them may be used in combination.

The polymerization initiator having no anionic group may, for example, be a peroxide such as benzyl peroxide, lauryl peroxide, succinyl peroxide or tert-butyl perpivalate; or an azo compound having no anionic group.

The azo compound having no anionic group may, for example, be 2,2'-azobis-2-methylbutyronitrile, dimethyl-2,2'-azobis isobutyrate, 2,2'-azobis[2-(2-imidazolin-2-yl)propane], 2,2'-azobis(4-methoxy-2,4-dimethylvaleronitrile), 1,1'-azobis(2-cyclohexane-1-carbonitrile), 2,2'-azobis(2,4-dimethylvaleronitrile), 1,1'-azobis(1-acetoxy-1-phenylethane) or dimethylazobisisobutyrate.

It is preferred to employ a chain transfer agent in the polymerization reaction to adjust the polymerization degree (molecular weight) of the fluorocopolymer. By using such a chain transfer agent, there is also such an effect that the total concentration of monomers in the solvent can be increased. As the chain transfer agent, the above-mentioned chain transfer agent having an anionic group may be used, or a chain transfer agent having no anionic group may be used, or both of them may be used in combination.

The chain transfer agent having no anionic group may, for example, preferably be an alkylmercaptan such as tert-dodecylmercaptan, n-dodecylmercaptan or stearyl mercaptan; aminoethanethiol, mercaptoethanol, 2,4-diphenyl-4-methyl-1-pentene, or carbon tetrachloride.

The total amount of the polymerization initiator is preferably within a range of from 0.1 to 2.0 parts by mass per 100 parts by mass of the total amount of the monomers to be used for the polymerization reaction. The total amount of the chain transfer agent is preferably within a range of from 0 to 2 parts by mass per 100 parts by mass of the total amount of the monomers to be used for the polymerization reaction.

The amount of the polymerization initiator having an anionic group and/or the chain transfer agent having an anionic group is adjusted so that a preferred amount of anionic groups be present in the above fluorocopolymer.

The reaction temperature during the polymerization reaction is preferably within a range of from room temperature to the boiling point of the reaction mixture. With a view to efficiently using the polymerization initiator, it is at least the half life temperature of the polymerization initiator, more preferably from 30 to 90° C.

The antifouling composition of the present invention preferably contains the above fluorocopolymer and an aqueous medium, wherein the content of a volatile organic solvent is at most 1 mass %.

An aqueous medium may be added after the polymerization reaction, and treatment to remove the polymerization solvent may be carried out as the case requires to obtain a composition having the fluorocopolymer dispersed in an aqueous medium, wherein the content of a volatile organic solvent is at most 1 mass %. The removal of the polymerization solvent is carried out, for example, by stripping (volatilization) treatment.

The aqueous medium may be a liquid containing water, wherein the content of a volatile organic solvent is at most 1 mass %, and specifically it may preferably be water or an azeotropic mixture containing water.

In the present invention, a volatile organic solvent in the antifouling composition means an organic solvent which volatilizes, when the antifouling composition is stored at room temperature, and specifically, it is an organic solvent having a boiling point of at most 100° C. at $1\times10^5$ Pa (hereinafter referred to simply as "a boiling point"). Here, a solvent which forms an azeotropic mixture with water is not included in the volatile organic solvent.

In the antifouling composition in such a form that the fluorocopolymer is dispersed in an aqueous medium, the content of the volatile organic solvent may be at most 1 mass % and is most preferably zero.

In a case where the fluorocopolymer is to be dispersed in an aqueous medium, as the polymerization solvent, it is preferred to employ a solvent having a relatively low boiling point (for example, a boiling point of at most 80° C.) or a solvent having an azeotropic composition with water, among the above-mentioned polymerization solvents, since the operation efficiency in treatment after the polymerization reaction is good. As an example of the solvent having a relatively low boiling point, acetone or methanol may be mentioned. The solvent having an azeotropic composition with water may, for example, be methyl ethyl ketone, methyl isobutyl ketone, 2-propyl alcohol, propylene glycol monomethyl ether or dipropylene glycol monomethyl ether. Acetone is more preferred.

In the present invention, it is preferred that after obtaining the fluorocopolymer by a polymerization reaction of monomers, amino groups in the copolymer are converted to amine salts, whereby the dispersibility of the copolymer in the aqueous medium will be improved.

For the conversion to amine salts, it is preferred to use an acid or the like, and it is more preferred to employ an acid having a dissociation constant or primary dissociation constant of at least $10^{-5}$. The acid may, for example, be preferably hydrochloric acid, hydrobromic acid, sulfonic acid, nitric acid, phosphoric acid, acetic acid, formic acid, propionic acid or lactic acid, more preferably acetic acid.

Otherwise, instead of converting amino groups of the fluorocopolymer to amine salts by using an acid, the amino groups may be converted to quaternary ammonium salt (conversion to quaternary salt) by using methyl iodide, ethyl iodide, dimethylsulfuric acid, diethylsulfuric acid, benzyl chloride, trityl phosphoric acid, methyl p-toluenesulfonic acid or the like.

<Antifouling Composition>

In the antifouling composition in such a form that the fluorocopolymer is dispersed in an aqueous medium, the solid content concentration of the fluorocopolymer is preferably from 1 to 50 mass %, more preferably from 10 to 30 mass %.

Further, in a case where the antifouling composition of the present invention is practically applied for treatment of a substrate, the solid content concentration may suitably be selected depending upon the substrate, treating method, etc. For example, it is preferably from 0.05 to 10 mass %, more preferably from 0.1 to 5 mass %.

The antifouling composition of the present invention may preferably contain a crosslinking agent and/or catalyst to improve the adhesion to a substrate by forming crosslinkage with the substrate, in an amount of from 0.3 to 1 mass % in the antifouling composition at the time of application to actual treatment of the substrate.

As such a crosslinking agent, a known crosslinking agent may suitably be used. Specifically, it may, for example, be urea or a condensate or preliminary condensate of melamine formaldehyde, a methylol-dihydroxyethylene-urea or its derivative, uron, methylol-ethylene-urea, methylol-propylene-urea, methylol-triazone, a dicyandiamide-formaldehyde condensate, methylol-carbamate, methylol-(meth)acrylamide, a polymer thereof, divinylsulfone, polyamide or its cation derivative, an epoxy derivative of e.g. diglycidyl glycerol, a halide derivative such as (epoxy-2,3-propyl)trimethylammonium chloride or N-methyl-N-(epoxy-2,3-propyl) morpholinium chloride, a pyridinium salt of chloromethyl ether of ethylene glycol, a polyamine-polyamide-epichlorohydrin resin or polyvinyl alcohol.

The above catalyst may preferably be ammonium chloride or an alkanolamine salt.

Various additives may be contained in the antifouling composition of the present invention. Such additives may, for example, be a fluorine-type water/oil repellent agent not included in the scope of the fluorocopolymer in the present invention, a non-fluorine type polymer blender, a penetrating agent, a defoaming agent, a film forming assistant, an insecticide, a flame retardant, an antistatic agent, an anticrease agent, a softener, etc.

<Treated Article>

The treated article of the present invention is one having the antifouling composition applied to a substrate.

The substrate is not particularly limited, and it may, for example, be fiber, fiber fabric, knitted fabric, nonwoven fabric, glass, paper, wood, leather, artificial leather, fur, asbestos, bricks, cement, ceramics, metal or metal oxide, ceramic product, plastics, etc. Among them, fiber, fiber fabric, knitted fabric or nonwoven fabric is more preferred. Examples of the fiber include animal or plant natural fiber such as cotton, hemp, wool or silk, a synthetic fiber such as polyamide, polyester, polyvinyl alcohol, polyacrylonitrile, polyvinyl chloride or polypropylene, a semisynthetic fiber such as rayon or acetate, an inorganic fiber such as glass fiber, and mixed fibers thereof.

The method for applying the antifouling composition to the substrate is not particularly limited so long as it is a method capable of attaching the antifouling composition to the substrate. For example, a method is preferred which comprises applying it to the surface of a substrate by a known coating method such as impregnation, immersion, spraying, brushing, padding, size press coating or roller coating, followed by drying. The drying may be carried out at room temperature or under heating, and is preferably carried out under heating. In the case of heating, the temperature is at a level of from 40 to 200° C. Further, in a case where the antifouling composition contains a crosslinking agent, it is preferred to carry out curing by heating at a temperature of at least the crosslinking temperature of the crosslinking agent, as the case requires.

In the treated article thus obtained, a coating film made of the antifouling composition of the present invention is attached to the surface of the substrate, and preferably, the surface of the substrate is covered with such a coating film.

According to the present invention, it is possible to obtain an antifouling composition having good aqueous dispersibility and good soil release property (SR property) which used to be difficult to attain simultaneously. That is, the antifouling composition of the present invention has an aqueous dispersibility, and at the same time, a treated article having a substrate treated with the antifouling composition of the present invention, has a good soil release property (SR property). The reason for such improvement is not clearly understood, but a contribution of the fact that the fluorocopolymer in the present invention has polymerized units (c') having an amino group and has anionic groups at its main chain terminals, and the perfluoroalkyl group is a short chain, is substantial. Particularly when polymerized units (c') having an amino group are introduced to a fluorocopolymer, although the aqueous dispersibility of the fluorocopolymer will be improved, the amino group is cationic and is likely to adsorb a soiling component, whereby the soil release property (SR property) will be deteriorated. Whereas, in the present invention, by introducing anionic groups to the main chain terminals of the fluorocopolymer having amino groups, adsorption of such a soiling component can be suppressed, whereby it is considered possible to improve the soil release property (SR property).

According to the present invention, the perfluoroalkyl group contained in the fluorocopolymer has a shorter chain having at most 6 carbon atoms, and such a fluorocopolymer may be dispersed in an aqueous medium to obtain an antifouling composition which contains little or no volatile organic solvent. Accordingly, it is possible to realize an environment-responsive antifouling composition.

Further, in the antifouling composition of the present invention, the monomer (a) having $R^F$ groups having at most 6 carbon atoms is used as the raw material, whereby it is possible to bring the content of a perfluorooctanoic acid (PFOA), perfluorooctanesulfonic acid (PFOS) and precursors or analogues thereof (i.e. the content in a case where the solid content concentration in the antifouling composition is 20 mass %) to a level of not higher than the detection limit as an analytical value of LC/MS/MS by the method disclosed in Japanese Patent Application No. 2007-333564.

EXAMPLES

Now, the present invention will be described in further detail with reference to Examples, but it should be understood that the present invention is by no means restricted to such Examples. In the following, "%" means "mass %" unless otherwise specified. In this specification, "EO" represents "—$C_2H_4O$—", and "PO" represents "—$C_3H_6O$—".

Evaluation of various properties was carried out by the following methods.

[Preparation of Test Cloth: Method of Treating Substrate Cloth]

In 150 g of a treating liquid obtained in each of the following Examples, a substrate cloth (non-treated cloth) was dipped and then squeezed by a mangle to a wet pickup of from 80 to 90%. Then, it was dried at 110° C. for 90 seconds and further subjected to curing heat treatment at 170° C. for 60 seconds to obtain a test cloth.

As the substrate cloth (non-treated cloth), a tropical cloth (hereinafter referred to as PET) made of non-dyed polyester was used.

[Method for Evaluation of Oil Repellency: Oil Repellency Grades (OR)]

With respect to the test cloth prepared by the above method, the oil repellency was evaluated in accordance with AATCC standards-TM118 method and shown by the oil repellency grades as identified in Table 1. The oil repellency grades are based on the wettability to the cloth, of eight types of hydrocarbon solvents (test liquids) different in the surface tension. The higher the oil repellency grade, the higher the oil repellency. Symbol +(−) for the oil repellency grade indicates that the performance in question is slightly better (poor). This oil repellency grade will be represented by "OR".

[Evaluation of Durability Against Washing]

Washing was carried out in accordance with JIS L-0217 103 washing method. Here, as detergent, weakly alkaline detergent is used, and no ion finishing is carried out. The evaluation result after carrying out washing once is shown in the section for "Initial", and the evaluation result after repeating the same washing method 5 time is shown in the section for "HL5".

TABLE 1

| Oil repellency grade | Test liquid | Surface tension of test liquid dyn/cm(25° C.) |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | 65 parts of Nujol/35 parts of hexadecane | 29.6 |
| 1 | Nujol | 31.2 |
| 0 | Less than 1 | |

[Method for Evaluation of Soil Release Property (SR Property)]

To the test cloth prepared by the above method, each of the following three types of soiling liquids was attached, followed by washing, whereby the soil releasing property was evaluated by the following method. For the judgment, the degree of removal of the soiling liquid was visually observed and represented by the grades identified in Table 2. The higher the grade, the higher the soil releasing property. Symbol +(−) for the soiling liquid-releasing degree grade indicates that the performance in question is slightly better (poor).

[Oily Stain 1 (DMO)]

A test cloth was spread on a blotting paper placed horizontally, and 5 drops (about 0.2 ml) of a soiling liquid having 0.1 mass % of carbon black added to used engine oil, were dropped thereon. A polyethylene sheet was put thereon, and a weight of 60 g was placed thereon. One hour later, the weight and the polyethylene sheet were removed. An excess soiling liquid was wiped off with a filter paper, and the test cloth was left to stand at room temperature for 20 minutes and then subjected to washing. Evaluation against this soiling liquid will be hereinafter represented by "DMO".

[Aqueous Stain]

The same operation as in the above [Oily Stain (DMO)] was carried out except that as the soiling liquid, one prepared by mixing the same amounts of a 0.1 mass % aqueous solution of food red color No. 2 (chemical name: amaranth) as a food additive and a 10.0 mass % aqueous solution of sucrose (saccharose), was used. Evaluation against this soiling liquid will hereinafter be represented by "Aqueous stain".

[Oily Stain 2]

A test cloth was spread on a blotting paper placed horizontally, and 3 drops (about 0.1 ml) of a liquid prepared by mixing 61.5 mass % of olive oil, 38.0 mass % of oleic acid, 1.0 mass % of iron(III) oxide for ferrite and 0.5 mass % of Oil red were dropped thereon from a height of 10 cm and left to stand for 1 minute. Then, an excess soiling liquid was wiped off by filter paper, and the test cloth was left to stand at room temperature for 20 minutes and then subjected to washing. Evaluation against this soiling liquid will hereinafter be represented by "Oily stain".

TABLE 2

| Soiling liquid-releasing degree grade | Evaluation standards |
|---|---|
| 5 | The stain was completely removed. |
| 4 | The stain was not completely removed and slightly remained. |
| 3 | The profile of the stain was vague, but the degree of removal was low. |
| 2 | The profile of the stain was clear. |
| 1 | The stain was not substantially removed. |
| 0 | The stain was not removed at all. |

Example 1

A fluorocopolymer was prepared to have the blend composition identified in Table 3, and an antifouling composition (treating liquid) containing it, was prepared. That is, into a 100 mL glass container, 11.2 g (56 parts by mass) of $C_6F_{13}C_2H_4OCOC(CH_3)=CH_2$ (purity: 99.7 mass %, hereinafter referred to as C6FMA) as the monomer (a), 7.8 g (39 parts by mass) of $CH_2=C(CH_3)COO(C_2H_4O)_9CH_3$ (wherein the chain length of EO is an average value, hereinafter referred to as ME0400M) as the monomer (b), 0.8 g (4 parts by mass) of N,N-dimethylaminoethyl methacrylate (hereinafter referred to as DM) as the monomer (c), 0.2 g (1 part by mass) of a 3,5-dimethylpyrazole adduct of a 2-isocyanateethyl methacrylate (hereinafter referred to as I35DP) as the monomer (d), 59.8 g of acetone as a polymerization solvent and 0.2 g (1 part by mass) of 4,4'-azobis(4-cyanovaleric acid) (hereinafter referred to as ACP) as a polymerization initiator, were charged and polymerized at 65° C. for 20 hours while being shaken in a nitrogen atmosphere, to obtain a slightly yellow solution having a solid content concentration of 24.8% (a polymer solution containing a fluorocopolymer).

To 50 g of the obtained polymer solution, 60 g of water and 0.28 g of acetic acid (1.5 times by molar equivalent of DM) were added and stirred to carry out treatment for an amine salt. Thereafter, acetone was removed at 60° C. under reduced pressure to obtain a slightly yellow transparent aqueous dispersion, and then, deionized water was added to obtain an aqueous dispersion having a solid content concentration of 20 mass %. The obtained aqueous dispersion was measured by capillary gas chromatography, whereby the acetone content was confirmed to be at most 1 mass %.

To deionized water, the obtained aqueous dispersion, BECKAMINE M-3 (melamine crosslinking agent, manufactured by DIC Corporation) as a crosslinking agent, and ACX (catalyst of melamine crosslinking agent M-3, manufactured by DIC Corporation) as a catalyst, were added to obtain an antifouling composition (treating liquid) wherein the solid content concentration of the fluorocopolymer was 1.8 mass %, the concentration of the crosslinking agent was 0.3 mass %, and the concentration of the catalyst was 0.3 mass %.

Examples 2 to 19

Fluorocopolymers were prepared in the same manner as in Example 1 except that in Example 1, the blend components were changed as identified in Tables 3 to 6, and antifouling compositions (treating liquids) containing them, were prepared.

The respective abbreviations used in the following Tables represent the following compounds.

<Monomer (a)>
C6FMA: $C_6F_{13}C_2H_4OCOC(CH_3)=CH_2$,
C6FA: $C_6F_{13}C_2H_4OCOCH=CH_2$,
C4FMA: $C_4F_9C_2H_4OCOC(CH_3)=CH_2$,
C4FA: $C_4F_9C_2H_4OCOCH=CH_2$,
$\alpha C_1$-C6FA: $C_6F_{13}C_2H_4OCOC(Cl)=CH_2$, <Monomer (b)>
MEO400M: $CH_2=C(CH_3)COO(C_2H_4O)_9CH_3$ (wherein the chain length of EO is an average value.)
MEO550M: $CH_2=C(CH_3)COO(C_2H_4O)_{12}CH_3$ (wherein the chain length of EO is an average value.)
MPO500: $CH_2=C(CH_3)COO(C_3H_6O)_9H$ (wherein the chain length of EO is an average value.)
MPO800: $CH_2=C(CH_3)COO(C_3H_6O)_{13}H$ (wherein the chain length of PO is an average value.)
OEOPO800B: $CH_2=C(CH_3)COO(C_2H_4O)_8(C_3H_6O)_6CH_2C(C_2H_5)C_4H_9$ (wherein EO and PO are arranged in block, and the chain length of EO and PO is an average value.)
2MEO400: $CH_2=C(CH_3)COO(C_2H_4O)_9COC(CH_3)=CH_2$ (wherein the chain length of EO is an average value.)
2MEO6000: $CH_2=C(CH_3)COO(C_2H_4O)_{136}COC(CH_3)=CH_2$ (wherein the chain length of EO is an average value.)
2MEOPO1700B: $CH_2=C(CH_3)COO(C_2H_4O)_L(C_3H_6O)_M(C_2H_4O)_NCOC(CH_3)=CH_2$ (wherein L+N≈15, M≈18, EO and PO are arranged in block, and the chain length of EO and PO is an average value.)
GEOPO350B: Compound represented by the following chemical formula (1) (wherein EO and PO are arranged in block, and the chain length of PO is an average value).

$$CH_2=C(CH_3)COO(C_2H_4O)_5(C_3H_6O)_2CH_2CH\underset{O}{\overset{}{\diagdown\!\diagup}}CH_2 \quad (1)$$

<Monomer (c)>
DM: N,N-dimethylaminoethyl methacrylate,
DMAP: N,N-dimethylaminopropyl methacrylamide,
DE: N,N-diethylaminoethyl methacrylate.

<Monomer (d)>
I35DP: 3,5-Dimethylpyrazole adduct of 2-isocyanateethyl methacrylate <Polymerization Initiator Having Anionic Group>
ACP: 4,4'-Azobis(4-cyanovaleric acid)

<Polymerization Initiator Having No Anionic Group>
DAIB: Dimethyl 2,2'-azobisisobutyrate <Chain Transfer Agent Having Anionic Group>
3 MP: 3-Mercaptopropionic acid

TABLE 3

| Examples | | 1 | 2 | 3 | 4 | 5 |
|---|---|---|---|---|---|---|
| Monomer (a) | C6FMA | 56 | 56 | 56 | 56 | 56 |
| Monomer (b) | MEO400M | 39 | 25 | 25 | 20 | — |
| | MEO550M | — | — | — | — | 25 |
| | MPO500 | — | 15 | 14 | 19 | 14 |
| Monomer (c) | DM | 4 | 4 | 4 | 4 | 4 |
| Monomer (d) | I35DP | 1 | — | 1 | 1 | 1 |
| Polymerization initiator | ACP | 1 | 1 | 1 | 1 | 1 |
| Polymerization solvent | Acetone | 300 | 300 | 300 | 300 | 300 |

TABLE 4

| Examples | | 6 | 7 | 8 | 9 |
|---|---|---|---|---|---|
| Monomer (a) | C6FMA | 56 | 56 | 56 | 56 |
| Monomer (b) | MEO400M | 25 | 29 | 24 | 24 |
| | MPO500 | — | — | 12 | 13 |
| | MPO800 | 14 | — | — | — |
| | OEOPO800B | — | 10 | — | — |
| | GEOPO350B | — | — | 4 | — |
| | 2MEO400 | — | — | — | 2 |
| Monomer (c) | DM | 4 | 4 | 4 | 4 |
| Monomer (d) | I35DP | 1 | 1 | — | 1 |
| Polymerization initiator | ACP | 1 | 1 | 1 | 1 |
| Polymerization solvent | Acetone | 300 | 300 | 300 | 300 |

TABLE 5

| Examples | | 10 | 11 | 12 | 13 | 14 | 15 |
|---|---|---|---|---|---|---|---|
| Monomer (a) | C6FMA | 56 | 56 | 56 | 56 | 56 | 56 |
| Monomer (b) | MEO400M | 24 | 24 | 25 | 25 | 25 | 25 |
| | MPO500 | 14 | 13 | 14 | 14 | 14 | 14 |
| | 2MEO6000 | 1 | — | — | — | — | — |
| | 2MEOPO1700B | — | 2 | — | — | — | — |
| Monomer (c) | DM | 4 | 4 | 4 | 4 | — | — |
| | DMAP | — | — | — | — | 4 | — |
| | DE | — | — | — | — | — | 4 |
| Monomer (d) | I35DP | 1 | 1 | 1 | 1 | 1 | 1 |
| Polymerization initiator | ACP | 1 | 1 | — | 1 | 1 | 1 |
| | DAIB | — | — | 1 | — | — | — |
| Chain transfer agent | 3MP | — | — | 0.5 | 0.5 | 0.5 | — |
| Polymerization solvent | Acetone | 300 | 300 | 300 | 300 | 300 | 300 |

TABLE 6

| Examples | | 16 | 17 | 18 | 19 |
|---|---|---|---|---|---|
| Monomer (a) | C6FA | 56 | — | — | — |
| | C4FMA | — | 56 | — | — |
| | C4FA | — | — | 60 | — |
| | αCl-C6FA | — | — | — | 56 |
| Monomer (b) | MEO400M | 25 | 25 | 25 | 25 |
| | MPO500 | 14 | 14 | 10 | 14 |
| Monomer (c) | DM | 4 | 4 | 4 | 4 |
| Monomer (d) | I35DP | 1 | 1 | 1 | 1 |
| Polymerization initiator | ACP | 1.6 | 1 | 1.6 | 1 |
| Polymerization solvent | Acetone | 300 | 300 | 300 | 300 |

Comparative Example 1

Non-Treated Cloth

Non-treated PET cloth was used for evaluation as it was.

Comparative Example 2

No Polymerization Unit (c'), Anionic Groups Present

A polymerization reaction was carried out in the same manner as in Example 1 except that in Example 1, the blend composition of monomers, polymerization initiator and acetone were changed as shown in Table 7 to obtain a slightly yellow solution having a solid content concentration of 25.3 mass % (a polymer solution containing a fluorocopolymer).

To 50 g of the obtained slightly yellow solution, 60 g of water was added, and acetone was removed at 60° C. under reduced pressure condition with stirring, whereby in the process of removing acetone, a water-insoluble substance was formed and it was not possible to obtain a complete aqueous dispersion.

Comparative Example

No Polymerized Units (c'), No Anionic Groups

In the blend composition as identified in Table 7, a fluorocopolymer was prepared. That is, a slightly yellow solution having a solid content concentration of 24.6 mass % (a polymer solution containing a fluorocopolymer) was obtained in the same manner as in Comparative Example 2 except that in Comparative Example 2, instead of ACP, 2,2'-azobis[2-(2-imidazol-2-yl)propane] (hereinafter referred to as AIP) as a polymerization initiator having no anionic group, was used.

To 50 g of the obtained slightly yellow solution, 60 g of water and 0.1 g of acetic acid (3 times by molar equivalent of AIP) were added, and acetone was removed at 60° C. under a reduced pressure condition with stirring, whereby a slightly yellow white milky solution was obtained, but the obtained aqueous solution was not adequate in stability, so that when it was left, a precipitate formed.

Comparative Example 4

No Polymerized Units (c'), No Anionic Groups

In the blend composition as identified in Table 7, a fluorocopolymer was prepared. That is, in Comparative Example 3, instead of 8.6 g (43 parts by mass) of MEO400M, 4.2 g (21 parts by mass) of MEO400M and 4.4 g (22 parts by mass) of MPO500 were used, but the liquid obtained by removal of acetone was separated into two layers and did not have aqueous dispersibility.

Comparative Example 5

Polymerized Units (c') Present, No Anionic Groups

A polymerization reaction was carried out in the same manner as in Example 1 except that in Example 1, the blend composition of the monomers, polymerization initiator and acetone was changed as identified in Table 7, to obtain a slightly yellow solution having a solid content concentration of 25.5 mass % (a polymer solution containing a fluorocopolymer).

Into a 100 mL glass container, 11.2 g (56 parts by mass) of C6FMA, 7.8 g (39 parts by mass) of MEO400M, 0.8 g (4 parts by mass) of DM, 0.2 g (1 part by mass) of I35DP, 59.8 g of acetone and 0.2 g (1 part by mass) of AIP were charged and polymerized at 65° C. for 20 hours while shaking in a nitrogen atmosphere, to obtain a slightly yellow solution having a solid content concentration of 25.5 mass %.

To 50 g of the obtained slightly yellow solution, 60 g of water and 0.29 g of acetic acid (1.5 times by molar equivalent of DM and 3 times by molar equivalent of AIP) were added, and acetone was removed at 60° C. under a reduced pressure condition with stirring to obtain a slightly yellow transparent aqueous dispersion, and then, by using deionized water, the aqueous dispersion was adjusted to a solid content concentration of 20 mass %. The obtained aqueous dispersion was measured by capillary gas chromatography, whereby the acetone content was confirmed to be at most 1 mass %.

By using the obtained aqueous dispersion, an antifouling composition (treating liquid) was prepared in the same manner as in Example 1.

Comparative Examples 6 to 13

Fluorocopolymers were prepared in the same manner as in Example 1 except that in Example 1, the blend components were changed as identified in Tables 8 and 9, and antifouling compositions (treating liquids) containing them were prepared. Here, the parts by mass of the chain transfer agent in Comparative Examples were adjusted to be the same mols as 3 MP being the chain transfer agent in Examples.

The respective abbreviations used in the following Tables represent the following compounds.

<Polymerization Initiator Having No Anionic Group>
  AIP: 2,2'-Azobis[2-(2-imidazol-2-yl)propane]
  AIBN: 2,2'-Azobisisobutyronitrile
<Chain Transfer Agent Having No Anionic Group>
  nDoSH: n-Dodecylmercaptan
  tDoSH: tert-Dodecylmercaptan

TABLE 7

| | | Comparative Examples | | | |
|---|---|---|---|---|---|
| | | 2 | 3 | 4 | 5 |
| Monomer (a) | C6FMA | 56 | 56 | 56 | 56 |
| Monomer (b) | MEO400M | 43 | 43 | 21 | 39 |
| | MPO500 | — | — | 22 | — |
| Monomer (c) | DM | — | — | — | 4 |
| Monomer (d) | I35DP | 1 | 1 | 1 | 1 |
| Polymerization | ACP | 1 | — | — | — |

TABLE 7-continued

|  |  | Comparative Examples | | | |
|---|---|---|---|---|---|
|  |  | 2 | 3 | 4 | 5 |
| initiator | AIP |  | 1 | 1 | 1 |
| Polymerization solvent | Acetone | 300 | 300 | 300 | 300 |

TABLE 8

|  |  | Comparative Examples | | | | |
|---|---|---|---|---|---|---|
|  |  | 6 | 7 | 8 | 9 | 10 |
| Monomer (a) | C6FMA | 56 | 56 | 56 | 56 | 56 |
| Monomer (b) | MEO400M | 25 | 25 | 25 | 25 | 25 |
|  | MPO500 | 14 | 14 | 14 | 14 | 14 |
| Monomer (c) | DM | 4 | 4 | 4 | 4 | 4 |
| Monomer (d) | I35DP | 1 | 1 | 1 | 1 | 1 |
| Polymerization initiator | AIP | 1 | — | — | — | — |
|  | DAIB | — | 1 | 1 | 1 | — |
|  | AIBN | — | — | — | — | 1 |
| Chain transfer agent | nDoSH | — | — | 1 | — | — |
|  | tDoSH | — | — | — | 1 | — |
| Polymerization solvent | Acetone | 300 | 300 | 300 | 300 | 300 |

TABLE 9

|  |  | Comparative Examples | | |
|---|---|---|---|---|
|  |  | 11 | 12 | 13 |
| Monomer (a) | C6FA | 56 | — | — |
|  | C4FMA | — | 56 | — |
|  | C4FA | — | — | 60 |
| Monomer (b) | MEO400M | 25 | 25 | 25 |
|  | MPO500 | 14 | 14 | 10 |
| Monomer (c) | DM | 4 | 4 | 4 |
| Monomer (d) | I35DP | 1 | 1 | 1 |
| Polymerization initiator | AIP | — | — | — |
|  | DAIB | 1.6 | 1 | 1.6 |
|  | AIBN | — | — | — |
| Polymerization solvent | Acetone | 300 | 300 | 300 |

Comparative Example 14

Perfluoroalkyl Group being Long Chain

Into a 100 mL glass container, 10.0 g (50 parts by mass) of $C_mF_{2m+1}C_2H_4OCOCH=CH_2$ (wherein the average value of m is 9, hereinafter referred to as CmFA), 5.6 (28 parts by mass) of MEO400M and 3.4 g (17 parts by mass) of MPO500, as the monomer (b), 0.8 g (4 parts by mass) of DM as the monomer (c), 0.2 g (1 part by mass) of I35DP as the monomer (d), 59.8 g of acetone and 0.3 g (1.6 parts by mass) of ACP as a polymerization initiator, were charged and polymerized at 65° C. for 20 hours, while shaking in a nitrogen atmosphere, to obtain a slightly yellow solution having a solid content concentration of 26.4 mass %. To 50 g of the obtained slightly yellow solution, 60 g of water and 0.28 g of acetic acid (1.5 times by molar equivalent of DM) were added, and acetone was removed at 60° C. under a reduced pressure condition with stirring, whereby in the process of removing acetone, a water insoluble substance was formed, and it was not possible to obtain a complete aqueous dispersion.

Comparative Example 15

Perfluoroalkyl Group being Long Chain

Polymerization was carried out in the same manner as in Comparative Example 14 except that in Comparative Example 14, the blend amount of MEO400M was changed to 5.1 g (26 parts by mass), the blend amount of MPO500 was changed to 3.0 g (15 parts by mass) and the blend amount of DM was changed to 1.6 g (8 parts by mass) to obtain a slightly yellow solution having a solid content concentration of 26.1 mass %. To 50 g of the obtained slightly yellow solution, 60 g of water and 0.56 g of acetic acid (1.5 times by molar equivalent of DM) were added, and acetone was removed at 60° C. under a reduced pressure condition with stirring, whereby the obtained aqueous dispersion was a slightly yellow one with strong turbidity. That is, as compared with Comparative Example 14, the aqueous dispersibility was improved, but it was not a transparent one as the aqueous dispersion obtainable in Examples.

[Evaluation Results]

Using the treating liquid obtained in each of the above Examples and Comparative Examples, a test cloth was prepared by the above-described method and evaluated by the above-described evaluation methods, and the results are shown in Tables 10 and 11.

TABLE 10

| Examples |  | Durability against washing | OR | DMO | Aqueous stain | Oily stain |
|---|---|---|---|---|---|---|
| Example 1 | Initial | 4 | 4 | 4 | 3 |
|  | HL5 | 3 | 4 | 5 | 3 |
| Example 2 | Initial | 5− | 5 | 4 | 3+ |
|  | HL5 | 4− | 4 | 5 | 3 |
| Example 3 | Initial | 5 | 5 | 4 | 4 |
|  | HL5 | 4 | 4+ | 5 | 3 |
| Example 4 | Initial | 5 | 5 | 4 | 3 |
|  | HL5 | 4− | 5 | 5 | 3 |
| Example 5 | Initial | 5 | 5 | 4 | 3+ |
|  | HL5 | 4 | 4+ | 5 | 3 |
| Example 6 | Initial | 5− | 5 | 3+ | 3 |
|  | HL5 | 4 | 5 | 5 | 3 |
| Example 7 | Initial | 6− | 5 | 4 | 3+ |
|  | HL5 | 3 | 5 | 5 | 3 |
| Example 8 | Initial | 5 | 5 | 4 | 3+ |
|  | HL5 | 4− | 5 | 5 | 3 |
| Example 9 | Initial | 5 | 5 | 5 | 3 |
|  | HL5 | 3 | 5 | 5 | 3 |
| Example 10 | Initial | 6− | 5 | 4 | 3 |
|  | HL5 | 4 | 5 | 5 | 3 |
| Example 11 | Initial | 5 | 5 | 4 | 3 |
|  | HL5 | 4− | 5 | 5 | 3 |
| Example 12 | Initial | 5 | 5 | 4 | 3+ |
|  | HL5 | 4 | 4+ | 5 | 3+ |
| Example 13 | Initial | 5− | 5 | 4 | 4 |
|  | HL5 | 3+ | 5 | 5 | 3+ |
| Example 14 | Initial | 4+ | 5 | 4 | 3+ |
|  | HL5 | 3 | 5 | 5 | 3 |
| Example 15 | Initial | 5 | 5 | 4 | 4 |
|  | HL5 | 3 | 5 | 5 | 3 |
| Example 16 | Initial | 3− | 4 | 4 | 3+ |
|  | HL5 | 3− | 4 | 5 | 3 |
| Example 17 | Initial | 4 | 4+ | 4 | 3 |
|  | HL5 | 2 | 4 | 5 | 3 |
| Example 18 | Initial | 2− | 4 | 3 | 3 |
|  | HL5 | 2− | 4 | 5 | 3 |
| Example 19 | Initial | 5 | 4+ | 4+ | 3+ |
|  | HL5 | 3 | 4 | 5 | 3 |

TABLE 11

| Examples | Durability against washing | OR | DMO | Aqueous stain | Oily stain |
|---|---|---|---|---|---|
| Comparative Example 1 | Initial | 0 | 2 | 5 | 0 |
| | HL5 | 0 | 2 | 5 | 0 |
| Comparative Example 2 | It was not possible to obtain a stabilized aqueous dispersion having an acetone content of at most 1 mass %. | | | | |
| Comparative Example 3 | It was not possible to obtain a stabilized aqueous dispersion having an acetone content of at most 1 mass %. | | | | |
| Comparative Example 4 | It was not possible to obtain a stabilized aqueous dispersion having an acetone content of at most 1 mass %. | | | | |
| Comparative Example 5 | Initial | 3 | 3+ | 4 | 3 |
| | HL5 | 2 | 2 | 5 | 2− |
| Comparative Example 6 | Initial | 5− | 5 | 4 | 3 |
| | HL5 | 3− | 4 | 5 | 3− |
| Comparative Example 7 | Initial | 5 | 5 | 4 | 3 |
| | HL5 | 2− | 3− | 5 | 2+ |
| Comparative Example 8 | Initial | 4+ | 4 | 4 | 3− |
| | HL5 | 2− | 2+ | 5 | 2 |
| Comparative Example 9 | Initial | 4+ | 4 | 4 | 3 |
| | HL5 | 2 | 3− | 5 | 2 |
| Comparative Example 10 | Initial | 5 | 5 | 4 | 3 |
| | HL5 | 4− | 4 | 5 | 3− |
| Comparative Example 11 | Initial | 2− | 4 | 4 | 3 |
| | HL5 | 2− | 4 | 5 | 3− |
| Comparative Example 12 | Initial | 4− | 4 | 4 | 3 |
| | HL5 | 2− | 4 | 5 | 3− |
| Comparative Example 13 | Initial | 1 | 4 | 2+ | 3 |
| | HL5 | 1 | 3+ | 5 | 2+ |
| Comparative Example 14 | It was not possible to obtain a stabilized aqueous dispersion having an acetone content of at most 1 mass %. | | | | |
| Comparative Example 15 | Initial | 5 | 5 | 4 | 3 |
| | HL5 | 4 | 4 | 4+ | 3− |

From the evaluation results shown in the Tables, it is evident that the antifouling compositions obtained in Examples are good in aqueous dispersibility and have good oil repellency, antifouling properties and durability against washing. Particularly, as compared with Comparative Examples, the soil release property in "Oil stain" is high, and the soil release property in "DMO" and "Aqueous stain" tends to be also high.

In Example 18, the evaluation results are slightly inferior as compared with other Examples. However, when this Example 18 is compared with Comparative Example 11 wherein the polymerization initiator in Example 18 was changed to DAIB having no anionic group, it is evident that in Example 18, each of the oil repellency and soil removal properties is improved.

INDUSTRIAL APPLICABILITY

According to the present invention, it is possible to obtain an antifouling composition which comprises, as an effective component, a fluorocopolymer having a $C_{1-6}$ perfluoroalkyl group which is recommended from the viewpoint of the influence to the environment, which can be formed into an aqueous dispersion containing substantially no volatile organic solvent and which has a good soil release property (SR property), and an article treated with such an antifouling composition.

The entire disclosure of Japanese Patent Application No. 2007-143463 filed on May 30, 2007 including specification, claims and summary is incorporated herein by reference in its entirety.

What is claimed is:

1. An antifouling composition comprising a fluorocopolymer which comprises from 30 to 70 mass % of polymerized units (a') based on the following monomer (a), from 20 to 69 mass % of polymerized units (b') based on the following monomer (b) and from 1 to 10 mass % of polymerized units (c') based on the following monomer (c), and which has anionic groups at its main chain terminals:

monomer (a): a compound represented by $F(CF_2)_sY$—$OCOCR$=$CH_2$, wherein s is an integer of from 1 to 6, R is a hydrogen atom, a $C_{1-3}$ alkyl group or a halogen atom, and Y is a $C_{1-10}$ alkylene group, monomer (b): a compound represented by $CH_2$=$CR^1$—$COO$—$(R^2O)_q$—$R^3$, wherein $R^1$ is a hydrogen atom or a methyl group, $R^2$ is a $C_{2-4}$ alkylene group, $R^3$ is a hydrogen atom, a $C_{1-8}$ alkyl group, a (meth)acryloyl group or a glycidyl group, q is an integer of from 1 to 140, and when q is from 2 to 140, the plurality of —$(R^2O)$— present in one molecule may be the same or different from one another, monomer (c): a compound represented by $CH_2$=$CR^4$-M-Q-$NR^5R^6$ or $CH_2$=$CR^4$-M-Q-$N(O)R^5R^6$, wherein $R^4$ is a hydrogen atom or a methyl group, M is —COO— or —CONH—, Q is a $C_{2-4}$ alkylene group or a $C_{2-3}$ alkylene group having some or all of hydrogen atoms substituted by hydroxy groups, each of $R^5$ and $R^6$ which are independent of each other, is a benzyl group, a $C_{1-8}$ alkyl group or a $C_{2-3}$ alkyl group having some or all of hydrogen atoms substituted by hydroxy groups, or $R^5$, $R^6$ and the nitrogen atom may form a piperidino group or a pyrrolidinyl group, or $R^5$, $R^6$, the oxygen atom and the nitrogen atom may form a morpholino group.

2. The antifouling composition according to claim 1, wherein the fluorocopolymer further comprises from 1 to 5 mass % of polymerized units (d') based on the following monomer (d):

monomer (d): a monomer which is copolymerizable with monomers (a), (b) and (c) and which has at least one crosslinkable functional group selected from the group consisting of an isocyanate group, a blocked isocyanate group, an urethane bond, an alkoxysilyl group, an epoxy group, an N-methylol group and an N-alkoxymethyl group, and has no polyfluoroalkyl group.

3. The antifouling composition according to claim 2, wherein the monomer (d) is a compound having a blocked isocyanate group.

4. The antifouling composition according to claim 1, wherein as the monomer (b), at least two types of the monomer (b) different in $R^2$ are used.

5. The antifouling composition according to claim 1, wherein the anionic groups are carboxy groups.

6. The antifouling composition according to claim 1, wherein the anionic groups are present in an amount of from 0.1 to 3.0 mass % per 100 mass % of the fluorocopolymer.

7. The antifouling composition according to claim 1, which comprises the fluorocopolymer and an aqueous medium, wherein the content of a volatile organic solvent is at most 1 mass %.

8. An article treated with the antifouling composition as defined in claim 1.

9. A method for producing an antifouling composition, which comprises polymerizing a monomer mixture comprising from 30 to 70 mass % of the following monomer (a), from 20 to 69 mass % of the following monomer (b) and from 1 to 10 mass % of the following monomer (c), in the presence of a polymerization initiator having an anionic group and/or a chain transfer agent having an anionic group:

monomer (a): a compound represented by $F(CF_2)_sY$—$OCOCR$=$CH_2$, wherein s is an integer of from 1 to 6, R is a hydrogen atom, a $C_{1-3}$ alkyl group or a halogen atom, and Y is a $C_{1-10}$ alkylene group, monomer (b): a compound represented by $CH_2$=$CR^1$—$COO$—$(R^2O)_q$—$R^3$, wherein $R^1$ is a hydrogen atom or a methyl group, $R^2$ is a $C_{2-4}$ alkylene group, $R^3$ is a hydrogen atom, a $C_{1-8}$ alkyl group, a (meth)acryloyl group or a glycidyl group, q is an integer of from 1 to 140, and when q is from 2 to 140, the plurality of $-(R^2O)-$ present in one molecule may be the same or different from one another, monomer (c): a compound represented by $CH_2=CR^4$-M-Q-$NR^5R^6$ or $CH_2=CR^4$-M-Q-N(O)$R^5R^6$, wherein $R^4$ is a hydrogen atom or a methyl group, M is $-COO-$ or $-CONH-$, Q is a $C_{2-4}$ alkylene group or a $C_{2-3}$ alkylene group having some or all of hydrogen atoms substituted by hydroxy groups, each of $R^5$ and $R^6$ which are independent of each other, is a benzyl group, a $C_{1-8}$ alkyl group or a $C_{2-3}$ alkyl group having some or all of hydrogen atoms substituted by hydroxy groups, or $R^5$, $R^6$; and the nitrogen atom may form a piperidino group or a pyrrolidinyl group, or $R^5$, $R^6$, the oxygen atom and the nitrogen atom may form a morpholino group.

10. The method for producing an antifouling composition according to claim 9, wherein the monomer mixture further comprises from 1 to 5 mass % of the following monomer (d):

monomer (d): a monomer which is copolymerizable with monomers (a), (b) and (c) and which has at least one crosslinkable functional group selected from the group consisting of an isocyanate group, a blocked isocyanate group, an urethane bond, an alkoxysilyl group, an epoxy group, an N-methylol group and an N-alkoxymethyl group, and has no polyfluoroalkyl group.

11. The method for producing an antifouling composition according to claim 9, wherein the polymerization initiator having an anionic group is an azo compound having a carboxy group.

12. The antifouling composition according to claim 1, wherein the amount of anionic groups present in the fluorocopolymer at its main chain terminals is at least 0.1 mass % per 100 mass % of the fluorocopolymer.

13. The antifouling composition according to claim 12, wherein the amount of anionic groups present in the fluorocopolymer at its main chain terminals is at most 3.0 mass %.

14. The antifouling composition according to claim 12, wherein the amount of anionic groups present in the fluorocopolymer at its main chain terminals is at most 2.0 mass %.

15. The antifouling composition according to claim 1, wherein the amount of anionic groups present in the fluorocopolymer at its main chain terminals is at least 0.3 mass % per 100 mass % of the fluorocopolymer.

16. The antifouling composition according to claim 15, wherein the amount of anionic groups present in the fluorocopolymer at its main chain terminals is at most 3.0 mass %.

17. The antifouling composition according to claim 15, wherein the amount of anionic groups present in the fluorocopolymer at its main chain terminals is at most 2.0 mass %.

* * * * *